(12) United States Patent
Zhang et al.

(10) Patent No.: US 12,209,640 B2
(45) Date of Patent: Jan. 28, 2025

(54) SPEED REDUCER

(71) Applicants: Yisi Zhang, Bundoora (AU); Eric Huwald, Bundoora (AU)

(72) Inventors: Yisi Zhang, Bundoora (AU); Eric Huwald, Bundoora (AU)

( * ) Notice: Subject to any disclaimer, the term of this patent is extended or adjusted under 35 U.S.C. 154(b) by 0 days.

(21) Appl. No.: 18/533,954

(22) Filed: Dec. 8, 2023

(65) Prior Publication Data

US 2024/0191780 A1     Jun. 13, 2024

(30) Foreign Application Priority Data

Dec. 13, 2022   (TW) .................................. 111147859

(51) Int. Cl.
| | |
|---|---|
| *F16H 1/32* | (2006.01) |
| *F16H 1/46* | (2006.01) |
| *F16H 57/023* | (2012.01) |
| *F16H 57/08* | (2006.01) |

(52) U.S. Cl.
CPC .............. *F16H 1/46* (2013.01); *F16H 57/023* (2013.01); *F16H 2001/327* (2013.01); *F16H 2057/085* (2013.01)

(58) Field of Classification Search
CPC .... F16H 1/46; F16H 57/023; F16H 2001/327; F16H 2057/085
See application file for complete search history.

(56) References Cited

FOREIGN PATENT DOCUMENTS

| CN | 206067493 U | * | 4/2017 | |
|---|---|---|---|---|
| CN | 109915544 A | * | 6/2019 | |
| CN | 110056698 A | * | 7/2019 | |
| DE | 4224850 A1 | * | 2/1994 | ........... F16H 1/2836 |
| JP | S6334343 A | * | 2/1988 | |
| JP | 2018066468 A | * | 4/2018 | |
| KR | 20100008580 U | * | 8/2010 | |

\* cited by examiner

*Primary Examiner* — Justin Holmes
(74) *Attorney, Agent, or Firm* — Rosenberg, Klein & Lee

(57) ABSTRACT

A speed reducer includes a drive gear, at least two planetary gears and a fixed internal gear that are arranged in sequence in an inside-out direction and mesh with one another. A movable internal gear is coaxially arranged beside the fixed internal gear. The number of teeth of the movable internal gear is different from the number of teeth of the fixed internal gear. The planetary gears extend into the movable internal gear and mesh with the movable internal gear, respectively. The drive gear is arranged along an axis for driving the planetary gears to rotate between the drive gear and the fixed internal gear. Due to the difference in the number of teeth between the fixed internal gear and the movable internal gear, when the planetary gears are rotated, the movable internal gear is pushed and moved by the planetary gears to perform a reduction output.

7 Claims, 7 Drawing Sheets

SPEED REDUCER

FIELD OF THE INVENTION

The present invention relates to a speed reducer, and more particularly to a speed reducer that has a more compact configuration in terms of space and size and provides a high reduction ratio.

BACKGROUND OF THE INVENTION

A speed reducer is a relatively precise machine, used for reducing the speed and increase the torque. A speed reducer is generally used in low-speed, high-torque transmission equipment (e.g., motors) to reduce the speed and increase the torque for high-speed rotational power.

Speed reducers on the market include planetary gear reducers, cycloidal reducers and harmonic reducers. In order to increase the reduction ratio, there is a compound speed reducer that combines a planetary gear set and a harmonic reduction mechanism, which is capable of generating outputs with multiple reduction ratios through the planetary gear set and the harmonic reduction mechanism, respectively, in order to meet the needs of the output end. However, these speed reducers are too large in size, especially in the length of the axis of the input shaft due to the excessive number of components. The configuration is too complex and occupies too much space, which is not conducive to the design requirements of miniaturization and refinement. The design of traditional compound planetary gears requires that the angle of the teeth of the planetary gear set is controlled to be the same in order to ensure smooth operation. Therefore, in the manufacture of gears, the standard involute tooth profile of the internal gear should be fully modified to eliminate interference with the planetary gears for smooth operation. Therefore, it is very difficult to manufacture, assemble or operate in practice. It is also the technical problem that the traditional compound planetary gears are generally encountered in the micro-precision transmission.

SUMMARY OF THE INVENTION

The primary object of the present invention is to provide a speed reducer that has a more compact configuration in terms of space and size and provides a high reduction ratio.

In order to achieve the foregoing object, the speed reducer provided by the present invention comprises a drive gear, at least two planetary gears and a fixed internal gear that are arranged in sequence in an inside-out direction and mesh with one another. A movable internal gear is coaxially arranged beside the fixed internal gear. The number of teeth of the movable internal gear is different from the number of teeth of the fixed internal gear. The planetary gears are each in the form of a hollow ring. The planetary gears extend into the movable internal gear and mesh with the movable internal gear, respectively. The drive gear is arranged along an axis for driving the planetary gears to rotate between the drive gear and the fixed internal gear. Due to the difference in the number of teeth between the fixed internal gear and the movable internal gear, when the planetary gears are rotated, the movable internal gear is pushed and moved by the planetary gears to perform a reduction output.

DETAILED DESCRIPTION OF THE PREFERRED EMBODIMENTS

Figure 1:
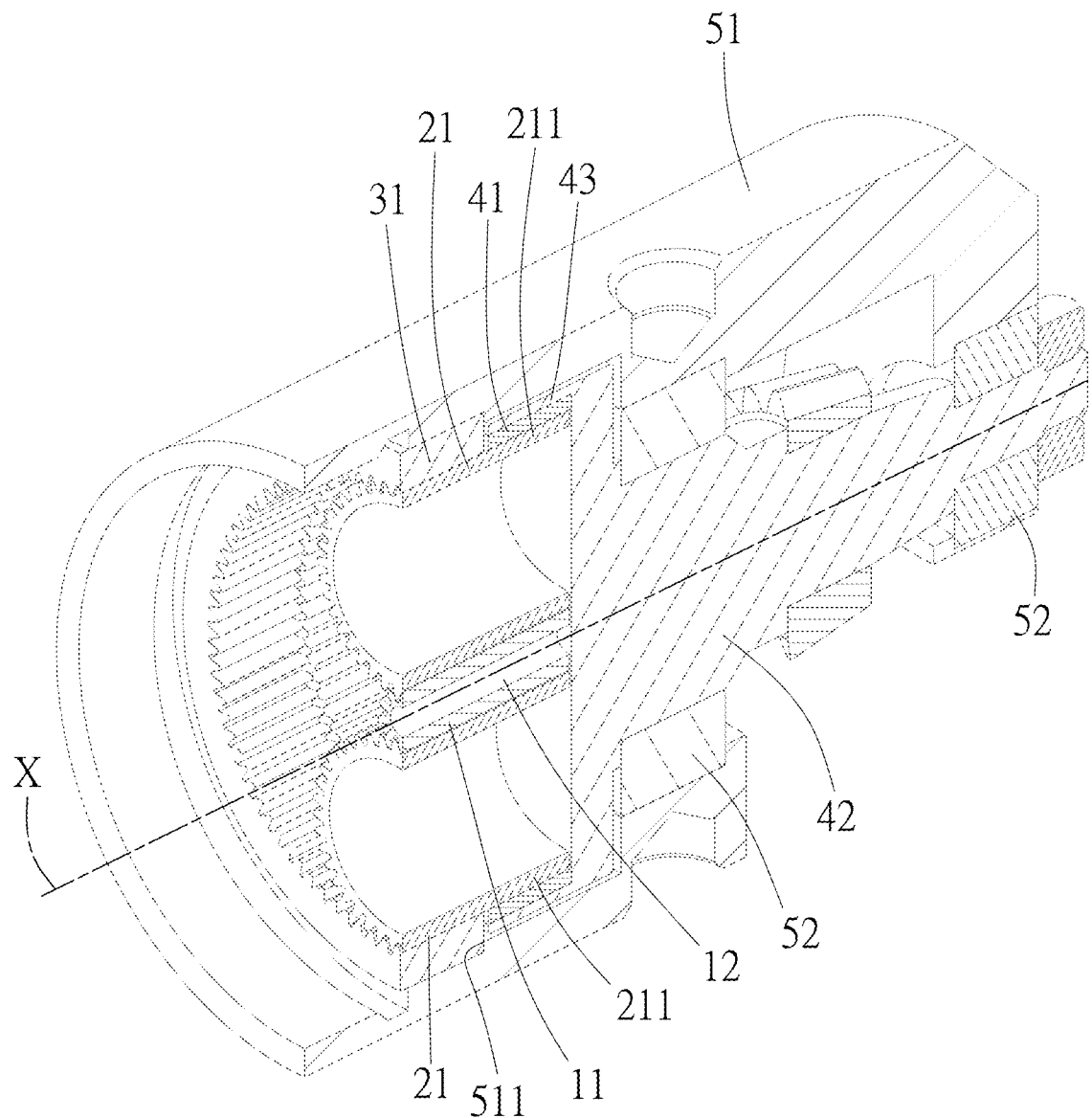
FIG. 1 is a perspective schematic view of the present invention.
Figure 2:
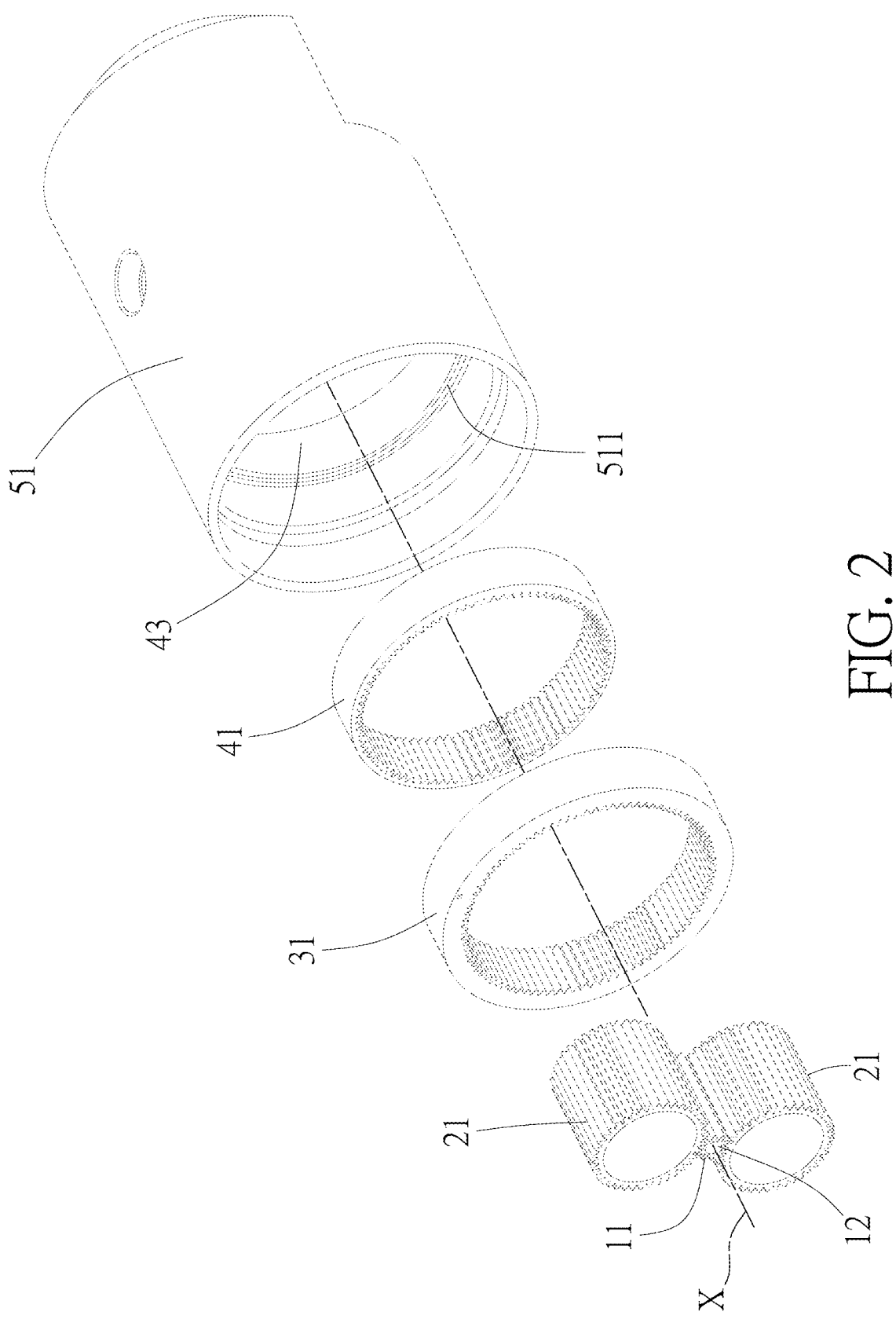
FIG. 2 is an exploded schematic view of the present invention.
Figure 3:
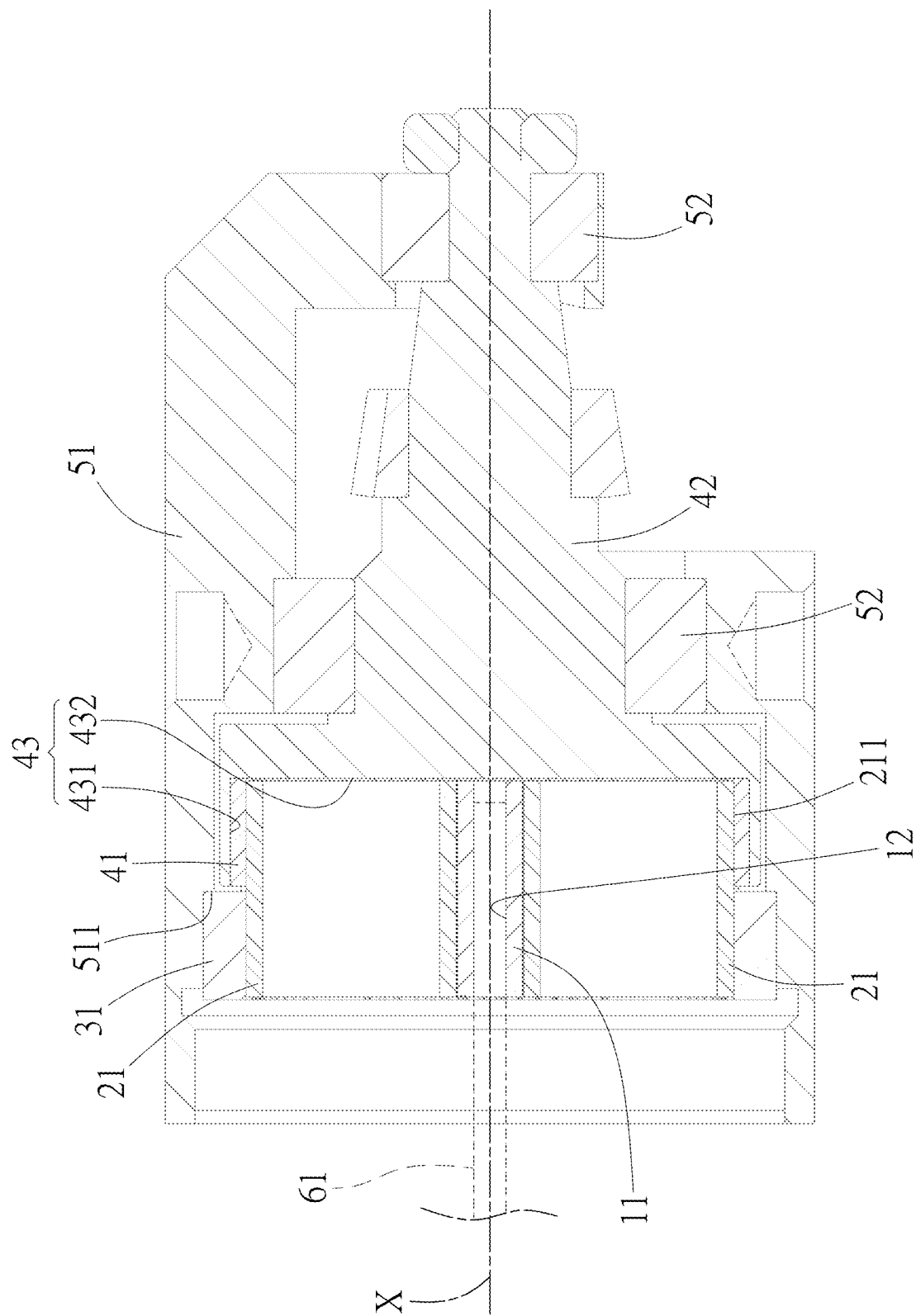
FIG. 3 is a cross-sectional view of the present invention after assembled.
Figure 4:
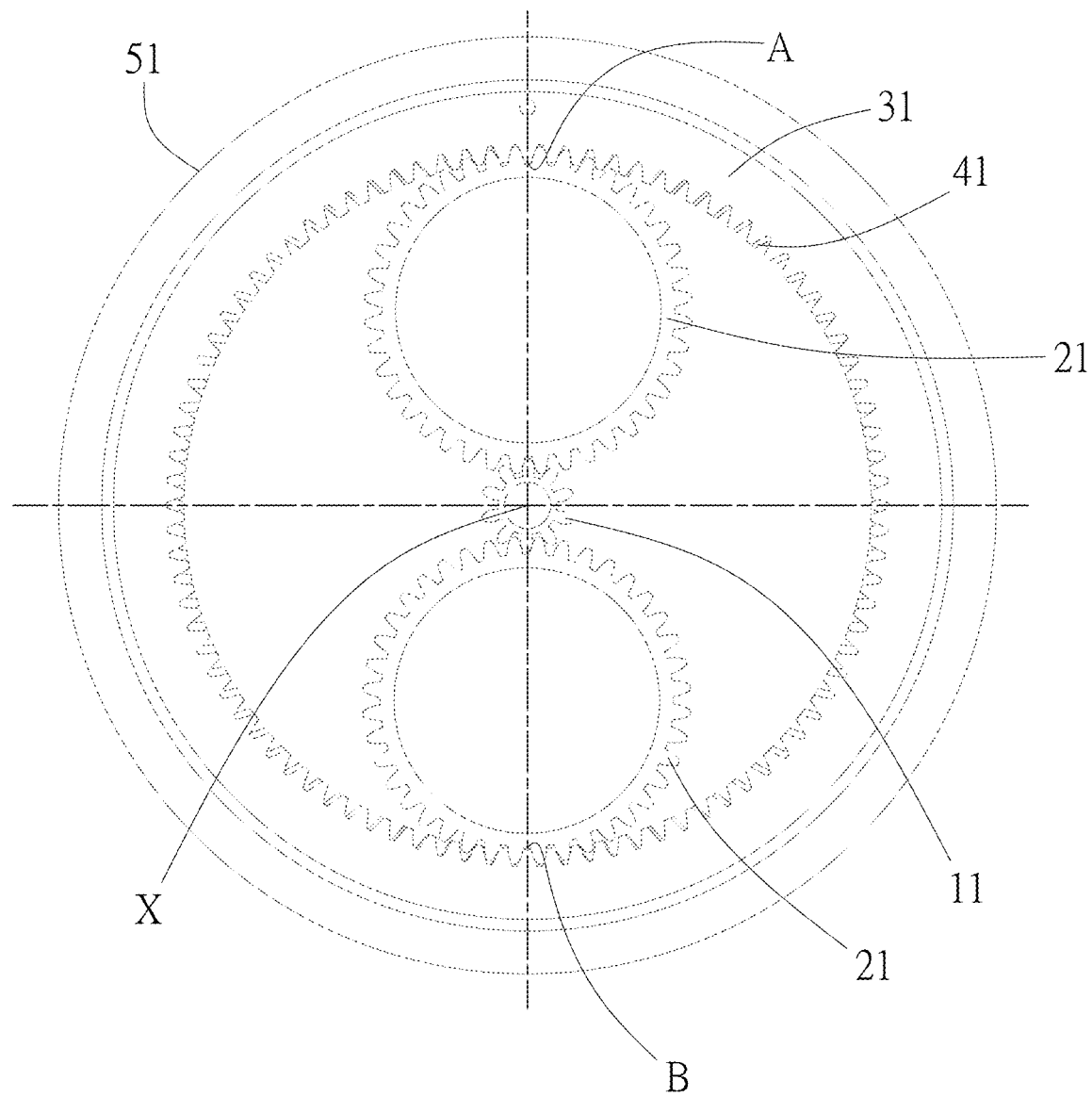
FIG. 4 is a schematic view showing the configuration of the gears of the present invention.

Referring to FIG. 1 through FIG. 4, a speed reducer provided by the present invention comprises a drive gear 11, at least two planetary gears 21 and a fixed internal gear 31 that are arranged in sequence in an inside-out direction and mesh with one another. A movable internal gear 41 is coaxially arranged beside the fixed internal gear 31. A casing 51 covers the drive gear 11, the planetary gears 21, the fixed internal gear 31 and the movable internal gear 41.

The drive gear 11 is arranged in the casing 51 along an axis X. The drive gear 11 has a mounting hole 12 extending along the axis X. The mounting hole 12 is configured for connecting a power shaft 61. The power shaft 61 may be a motor transmission shaft for supplying rotational power to rotate the drive gear 11.

The number of planetary gears 21 may be two or more. In this embodiment, two planetary gears 21 are taken as an example. The two planetary gears 21 are each in the form of a hollow ring with deformation elasticity. The two planetary gears 21 are spaced apart from each other and mesh with the periphery of the drive gear 11 at the same arc distance, so that the two planetary gears 21 are arranged symmetrically with each other. The two planetary gears 21 have the same gear module. The two planetary gears 21 mesh with the fixed internal gear 31, respectively. That is to say, the two planetary gears 21 are arranged between the drive gear 11 and the fixed internal gear 31. The fixed internal gear 31 is fixed to a stepped face 511 inside the casing 51. The fixed internal gear 31 and the drive gear 11 have the same axis X. The fixed internal gear 31 itself does not rotate. When the drive gear 11 is driven by the power shaft 61 to rotate, the two planetary gears 21 will be driven to rotate synchronously. Simultaneously, the two planetary gears 21 revolve around the inner circumference of the fixed internal gear 31 to generate a first-stage reduction output. In this embodiment, the two planetary gears 21 are each made of a rigid material in the form of a hollow ring, so they have a certain degree of rigidity and are suitable for use in a high-load environment and have appropriate deformation elasticity.

Further, the two planetary gears 21 extend out of the fixed internal gear 31 in a direction parallel to the axis X, respectively. The movable internal gear 41 is coaxially arranged beside the fixed internal gear 31. The movable internal gear 41 and the fixed internal gear 31 have the same axis X. The movable internal gear 41 is connected to an output shaft 42. The movable internal gear 41 and the fixed internal gear 31 have different gear modules. The gear module of the movable internal gear 41 is greater than the gear module of the fixed internal gear 31. The number of teeth of the movable internal gear 41 is different from the number of teeth of the fixed internal gear 31, so that the movable internal gear 41 and the fixed internal gear 31 have different pitch diameters. In this embodiment, the number of teeth of the movable internal gear 41 is 88, and the number of teeth of the fixed internal gear 31 is 90. The number of teeth of the movable internal gear 41 and the number of teeth of the fixed internal gear 31 differ by two. The teeth of the fixed internal gear 31 and the movable internal gear 41 are gradually staggered from two opposite end positions A, B facing each other. That is to say, the teeth of the fixed internal gear 31 and the movable internal gear 41 are symmetrically overlapped with each other in two positions at 180 degrees, while the other positions are misaligned with each other. The two planetary gears 21 are each in the form of a hollow ring. The two planetary gears 21 each have a protrudent end 211 that extends out of the fixed internal gear 31 and meshes with the teeth of the movable internal gear 41 aligned with the teeth of the fixed internal gear 31. The gear module of the movable internal gear 41 is larger than the gear module of the fixed internal gear 31 to ensure smooth operation of the two planetary gears 21.

In this embodiment, the output shaft 42 is recessed at one end along the axis X to form an accommodating room 43. The accommodating room 43 has an inner peripheral wall 431 and a bottom 432 connected to the inner peripheral wall 431. The movable internal gear 41 is correspondingly fitted and connected to the inner circumferential wall 431 of the accommodating room 43. The drive gear 11 and the protrudent ends 211 of the two planetary gears 21 are located in the accommodating room 43 and abut against the bottom 432 to ensure the stability of the drive gear 11 and the two planetary gears 21 during operation. At least one bearing unit 52 is provided between the periphery of the output shaft 42 and the casing 51. The bearing unit 52 may be a rolling bearing or a bushing for supporting the rotation of the output shaft 42, so as to minimize friction and vibration during rotation. In addition, because the two planetary gears 21 are each in the form of a hollow ring and have deformation elasticity, the speed reducer provided by the present invention only needs to modify the partial tooth profile of the internal teeth (including the fixed internal gear 31 and the movable internal gear 41) during the modification operation of the original standard internal teeth, leaving an appropriate interference area to generate the right amount of frictional resistance. After the planetary gears 21 each in the form of a hollow ring are elastically deformed due to the operating force, the interference between the gears will be minimized to ensure that the planetary gears 21 of the present invention can maintain stable operation without the need for a planetary carrier.

Figure 7:
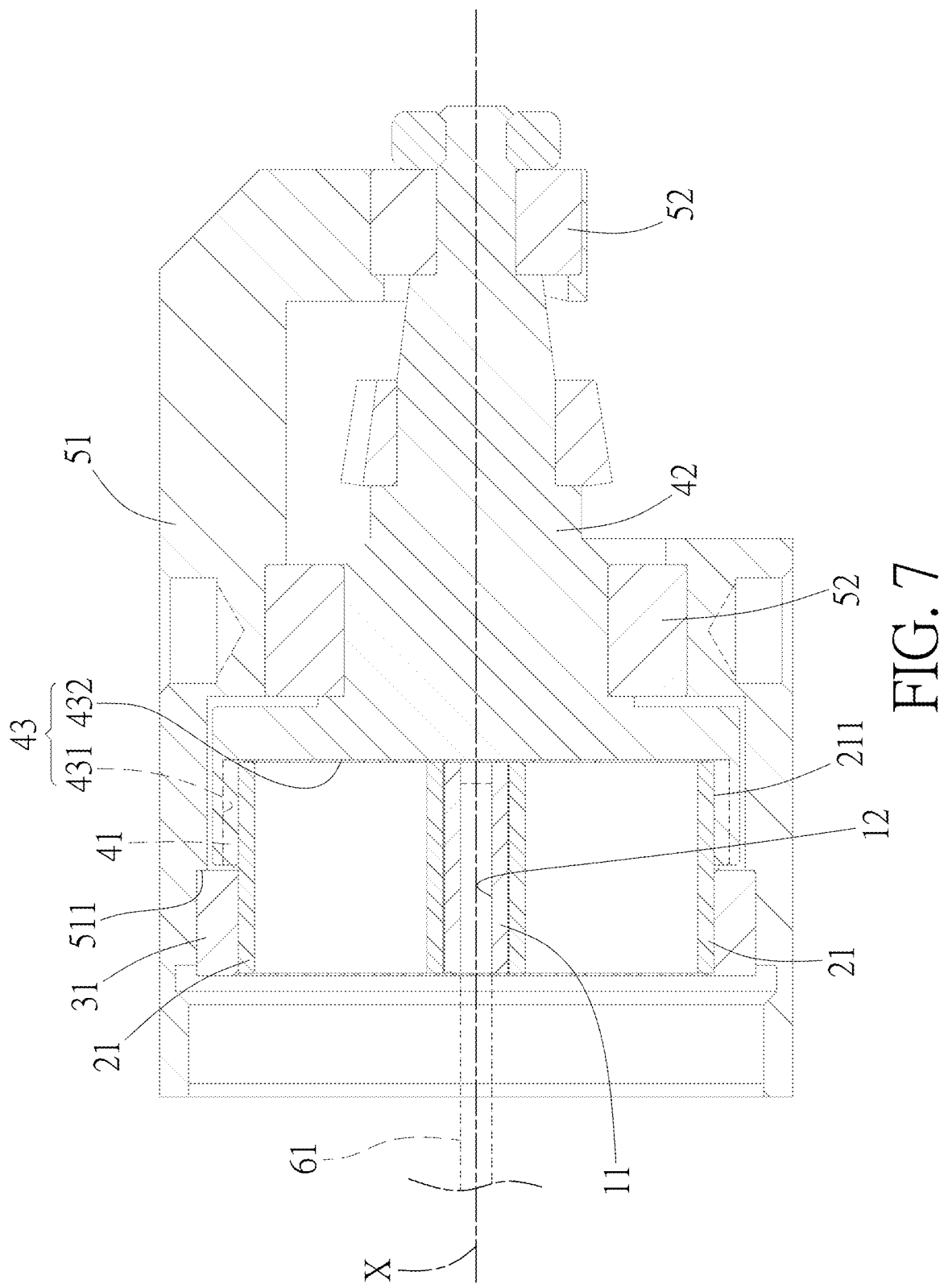
FIG. 7 is a schematic view showing the structure of another feasible embodiment of the present invention.

In other feasible embodiments, as shown in FIG. 7, the movable internal gear 41 may be integrally formed with the inner circumferential wall 431 of the accommodating room 43 of the output shaft 42 to mesh with the protrudent ends 211 of the two planetary gears 21. The drive gear 11 and the protrudent ends 211 of the two planetary gears 21 are located in the accommodating room 43 and abut against the bottom 432 to ensure the stability of the drive gear 11 and the two planetary gears 21 during operation.

Figure 5:
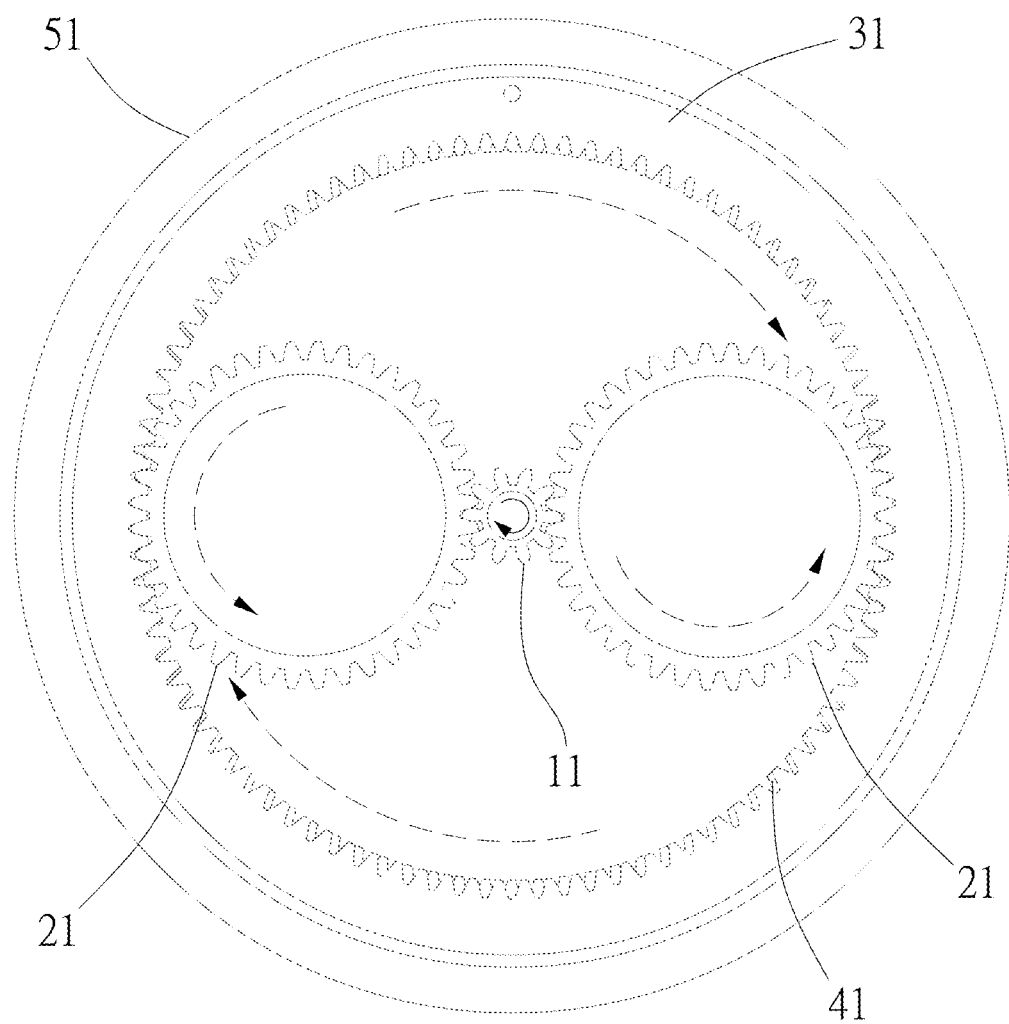
FIG. 5 is a schematic view of the present invention in a transmission state.
Figure 6:
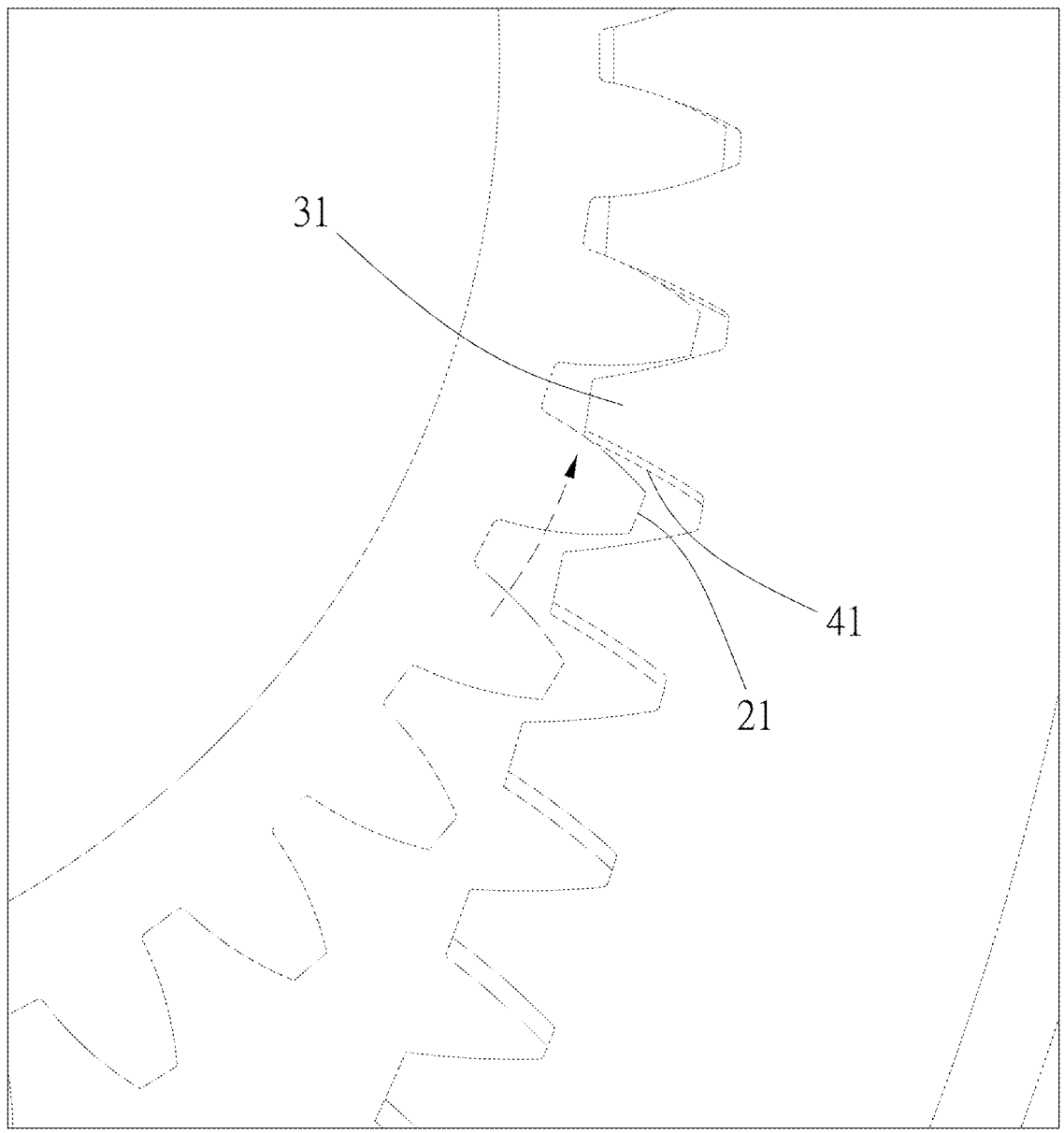
FIG. 6 is a partial enlarged schematic view of the present invention, illustrating that the movable internal gear is pushed due to the difference in the number of teeth.

Next, referring to FIG. 5, when the power shaft 61 drives the drive gear 11 to rotate, the power of the drive gear 11 will drive the two planetary gears 21 meshing with the drive gear 11 to rotate. At the same time, the two planetary gears 21 are driven to rotate between the drive gear 11 and the fixed internal gear 31 to generate a first-stage reduction output. Since the protrudent ends 211 of the two planetary gears 21 are meshed with the movable internal gear 41, after the first-stage reduction output is generated, the movable internal gear 41 will be driven relatively because the fixed internal gear 31 is fixed in the casing 51 and cannot rotate. During the revolution of the two planetary gears 21 around the drive gear 11, as shown in FIG. 6, through the difference in the number of teeth between the movable internal gear 41 and the fixed internal gear 31, the two planetary gears 21 push the staggered internal teeth of the movable internal gear 41 and the fixed internal gear 31 one by one to drive the movable internal gear 41 to start rotating. When the two planetary gears 21 are rotated, the meshing portions of the two planetary gears 21 and the movable internal gear 41 will push and move the movable internal gear 41 to perform a high reduction ratio output due to the difference in the number of teeth, so as to synchronously drive the output shaft 42 connected with the movable internal gear 41 to produce a second-stage reduction output for the subsequent equipment that has the need to reduce the rotational speed.

The reduction ratio of the speed reducer provided by the present invention can be calculated according to the following formula:

$$\text{Reduction ratio} = \left(1 + \frac{N3}{N1}\right) \times \frac{N4}{(N3 - N4)}$$

Therein, the number of teeth of the drive gear 11 is defined as N1, the number of teeth of the fixed internal gear 31 is defined as N3, and the number of teeth of the movable internal gear 41 is defined as N4.

In this embodiment, the number of teeth of the drive gear 11 is 10, the number of teeth of the two planetary gears is 40, the number of teeth of the fixed internal gear 31 is 90, and the number of teeth of the movable internal gear 41 is 88. These values are substituted into the formula to calculate the reduction ratio up to 440.

In summary, it is understood that the two-stage reduction output described in the present invention is specific and feasible. Through the structural configuration of the drive gear 11, the two planetary gears 21, the fixed internal gear 31 and the movable internal gear 41, the present invention not only increases the reduction ratio within the effective space but also simplify the assembly of the speed reducer greatly. The overall configuration space and volume of the speed reducer provided by the present invention can be more compact, meeting the installation requirements of miniaturized and refined equipment.

In addition, the present invention, through the gears are each in the form of a hollow ring with deformation elasticity, enables each planetary gear 21 to maintain an appropriate interference zone between the gears (including the drive gear 11, the fixed internal gear 31 and the movable internal gear 41), in order to reduce the backlash effectively and to have the effect of precise transmission and accurate positioning. The friction resistance formed in the interference zone can produce a braking effect when the power shaft 61 driven by the motor stops running, which is beneficial to control the motion without relying on the motor to brake. When the motor stops, it can provide sufficient resistance to generate a self-locking function, and the motor does not need to run when maintaining a specific angle. This can reduce the power loss of the motor and save power consumption of the motor greatly. Further, the planetary gear 21 in the form of a hollow ring can reduce the rotational inertia. The frictional heat generated by high-speed rotation is also reduced, thus keeping the temperature of each planetary gear 21 in high-speed rotation to improve its stability and service life.

In addition, in the speed reducer provided by the present invention, the two planetary gears 21 are meshed with the fixed internal gear 31 and the movable internal gear 41 at the same time at the two end positions A, B that are symmetrical at 180 degrees. Through the transmission by differential gearing, the transmission with a large reduction ratio can be achieved. Through the large number of teeth meshing with each other, larger meshing area ensures larger torque output, which results in high torque and accurate positioning. The gear meshing cycle speed is low and the force balance is even, which can further reduce noise and vibration. Since there is less slipping between the meshing portions, the power loss due to friction can be reduced effectively. Even at high reduction ratios, high power efficiency is maintained, and the motor used for supplying power can be further miniaturized.

What is claimed is:

1. A speed reducer, comprising:
   a casing;
   a drive gear disposed in the casing and along an axis for being rotatably driven by an input power shaft disposed at a first end of the casing;
   at least two planetary gears disposed in the casing, each of the at least two planetary gears being elastically deformable and meshing with the drive gear;
   a fixed internal gear disposed in the casing coaxially with respect to the axis of the drive gear, and the fixed internal gear meshes with each of the at least two planetary gears, wherein the drive gear drives each of the at least two planetary gears to rotate between the drive gear and the fixed internal gear;
   a movable internal gear disposed in the casing coaxially with respect to the axis of the drive gear and adjacent to the fixed internal gear, wherein a number of teeth of the movable internal gear is different from a number of teeth of the fixed internal gear, wherein a peripheral portion of each of the at least two planetary gears extend into the movable internal gear for meshing with the movable internal gear;
   wherein the casing covers the drive gear, each of the at least two planetary gears, the fixed internal gear, and the movable internal gear; and
      an output shaft disposed at a second opposing end of the casing and connected to the movable internal gear, the output shaft being recessed at an end adjacent to the movable internal gear to form an accommodating room, wherein the accommodating room has a pair of opposing inner peripheral circumferential walls and a bottom connected between the pair of inner peripheral circumferential walls, wherein the bottom defines a wall portion extending fully between the pair of inner peripheral circumferential walls to thereby traverse a full length defined by a diametric extent of the movable internal gear, wherein the movable internal gear is correspondingly fitted and connected to the pair of inner peripheral circumferential walls of the accommodating room and the drive gear and the at least two planetary gears are located in the accommodating room to abut and physically contact for bearing against the wall section defined by the bottom, and wherein a diameter of the output shaft is greater than a diameter of the input power shaft; and
   wherein when the at least two planetary gears are rotated responsive to the rotation of the drive gear, the movable internal gear is responsively driven by the at least two planetary gears to increase a reduction output in correspondence with the difference in the number of teeth between the fixed internal gear and the movable internal gear.

2. The speed reducer as claimed in claim 1, wherein the drive gear has a mounting hole extending along the axis, and the input power shaft being disposed within the mounting hole of the drive gear for supplying rotational power for rotating the drive gear.

3. The speed reducer as claimed in claim 2, wherein the at least two planetary gears are spaced apart from each other and mesh with a periphery of the drive gear at a same arc distance, thereby the at least two planetary gears are arranged symmetrically with respect to the drive gear, and responsive to the number of teeth of the movable internal gear being different from the number of teeth of the fixed internal gear, the teeth of the fixed internal gear and the teeth of the movable internal gear are, respectively, gradually staggered from two corresponding opposite end positions facing each other.

4. The speed reducer as claimed in claim 3, wherein a gear module of the movable internal gear is greater than a gear module of the fixed internal gear, the at least two planetary gears have a same gear module, each of the at least two planetary gears have a protrudent end extending in a direction parallel to the axis, and the protrudent end of each of the at least two planetary gears extends through the fixed internal gear for meshing with the teeth of the movable internal gear.

5. The speed reducer as claimed in claim 4, wherein the movable internal gear is integrally formed with the pair of inner peripheral circumferential walls of the accommodating room.

6. The speed reducer as claimed in claim 5, further comprising at least one bearing unit between a periphery of the output shaft and the casing for supporting the output shaft.

7. The speed reducer as claimed in claim 1, wherein at least one bearing unit is provided between a periphery of the output shaft and the casing for supporting the output shaft.

* * * * *